(12) United States Patent
Stokking et al.

(10) Patent No.: US 11,087,527 B2
(45) Date of Patent: Aug. 10, 2021

(54) SELECTING AN OMNIDIRECTIONAL IMAGE FOR DISPLAY

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Hans Maarten Stokking, Wateringen (NL); Simon Norbert Bernhard Gunkel, Duivendrecht (NL); Martin Prins, The Hague (NL); Hendrikus Nathaniel Hindriks, The Hague (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/204,024

(22) Filed: Nov. 29, 2018

(65) Prior Publication Data

US 2019/0172252 A1 Jun. 6, 2019

(30) Foreign Application Priority Data

Dec. 1, 2017 (EP) ..................... 17204834

(51) Int. Cl.
*G06T 15/20* (2011.01)
*G02B 27/01* (2006.01)
(Continued)

(52) U.S. Cl.
CPC .......... *G06T 15/205* (2013.01); *G02B 27/017* (2013.01); *G06F 1/163* (2013.01);
(Continued)

(58) Field of Classification Search
CPC ..... G06T 15/205; G06T 3/4038; G06F 3/011; G06F 3/012; H04N 13/383; G09G 2320/0261
See application file for complete search history.

(56) References Cited

U.S. PATENT DOCUMENTS

| | | | |
|---|---|---|---|
| 8,798,451 B1 * | 8/2014 | Kweon | G06T 3/0018 396/20 |
| 2003/0012410 A1 * | 1/2003 | Navab | G06K 9/209 382/103 |

(Continued)

OTHER PUBLICATIONS

European Extended Search Report, European Patent Application No. 17204834, dated Aug. 23, 2018, 14 pages.
(Continued)

*Primary Examiner* — Terrell M Robinson
(74) *Attorney, Agent, or Firm* — McDonnell Boehnen Hulbert & Berghoff LLP

(57) ABSTRACT

Some embodiments involve obtaining access to a number of omnidirectional images each representing a different viewpoint relative to a scene, and to metadata indicating a physical relation between the respective viewpoint and a physical object in the scene. Viewer data may be obtained that is indicative of a current physical relation between a viewpoint of the user and a same type of physical object in a current viewing environment of the user. An omnidirectional image may then be selected for display by comparing the viewer data to the metadata of the omnidirectional images.

In other embodiments, an omnidirectional image may be selected, e.g., from omnidirectional images or by being the only available image, and the user may be instructed to assume a viewpoint in which the physical relation to the
(Continued)

physical object in the user's current viewing environment corresponds to the physical relation as indicated by the selected image's metadata.

22 Claims, 7 Drawing Sheets

(51) Int. Cl.
| | |
|---|---|
| *H04N 13/383* | (2018.01) |
| *G06F 3/14* | (2006.01) |
| *G06F 3/01* | (2006.01) |
| *G06F 1/16* | (2006.01) |
| *H04N 7/18* | (2006.01) |
| *G06F 3/147* | (2006.01) |
| *G06T 3/40* | (2006.01) |
| *H04N 13/344* | (2018.01) |

(52) U.S. Cl.
CPC .............. *G06F 3/011* (2013.01); *G06F 3/012* (2013.01); *G06F 3/14* (2013.01); *G06F 3/147* (2013.01); *G06T 3/4038* (2013.01); *H04N 7/18* (2013.01); *H04N 13/383* (2018.05); *G02B 2027/014* (2013.01); *G02B 2027/0138* (2013.01); *G02B 2027/0187* (2013.01); *G09G 2320/0261* (2013.01); *H04N 13/344* (2018.05)

(56) References Cited

U.S. PATENT DOCUMENTS

| | | | | |
|---|---|---|---|---|
| 2003/0063133 | A1 | 4/2003 | Foote et al. | |
| 2008/0024523 | A1* | 1/2008 | Tomite | G06T 15/50 345/632 |
| 2012/0001901 | A1* | 1/2012 | Park | G06T 19/006 345/419 |
| 2012/0249741 | A1* | 10/2012 | Maciocci | G06F 3/011 348/46 |
| 2014/0347391 | A1* | 11/2014 | Keane | G06F 3/04815 345/633 |
| 2015/0094142 | A1 | 4/2015 | Stafford | |
| 2015/0154803 | A1* | 6/2015 | Meier | G06T 19/006 345/633 |
| 2015/0268473 | A1* | 9/2015 | Yajima | G02B 27/0172 345/633 |
| 2016/0088287 | A1* | 3/2016 | Sadi | H04N 13/261 348/43 |
| 2016/0269685 | A1 | 9/2016 | Jessop et al. | |
| 2016/0353090 | A1* | 12/2016 | Esteban | G02B 27/0172 |
| 2017/0163970 | A1 | 6/2017 | Gronholm et al. | |
| 2018/0003979 | A1* | 1/2018 | Nakashima | G02B 27/0172 |
| 2018/0122042 | A1* | 5/2018 | Kim | H04N 5/2628 |
| 2018/0247454 | A1* | 8/2018 | Sawaki | G02B 27/0172 |
| 2018/0374192 | A1* | 12/2018 | Kunkel | G06T 15/205 |

OTHER PUBLICATIONS

European Partial Search Report, European Patent Application No. 17204834, dated May 16, 2018, 13 pages.

Cutting, James E., "High-Performance Computing and Human Vision I—How the Eye Measures Reality and Virtual Reality", Behavior Research Methods, Instruments & Computers, vol. 29, No. 1, 1997, pp. 27-36.

"Exchangeable Image File Format for Digital Still Cameras", Camera & Imaging Products Association, Exif Version 2.31, JEITA CP-3451D, CIPA DC-008-2016, Jul. 2016, 191 pages.

Tanimoto, Masayuki, "Overview Paper—FTV (Free-Viewpoint Television)", APSIPA Transactions on Signal and Information Processing, vol. 1, 2012, pp. 1-14.

Mavlankar, Aditya et al., "Optimal Slice Size for Streaming Regions of High Resolution Video With Virtual Pan/Tilt/Zoom Functionality", 15th European Signal Processing Conference (EUSIPCO 2007), Sep. 3-7, 2007, pp. 1275-1279.

"Photo Sphere XMP Metadata \ Street View \ Google Developers", https://developers.google.com/streetview/spherical-metadata, downloaded from internet Nov. 28, 2018, 4 pages.

Facebook, "Editing 360 Photos & Injecting Metadata—Facebook 360 Video", https://facebook360.fb.com/editing-360-photos-injecting-metadata, downloaded from internet Nov. 28, 2018, 5 pages.

Extended European Search Report for EP Application No. 18209411.0 dated Jun. 14, 2019.

Kinect.TheKinectforWindowssensorandSDKandSDKCreatedby Dr LeandroDihl:http://www.inf.pucrs.br/smusse/CG/PDFs20141= Kinect:pdf.

* cited by examiner

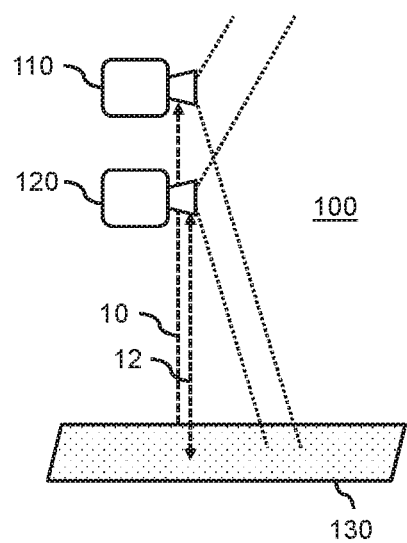
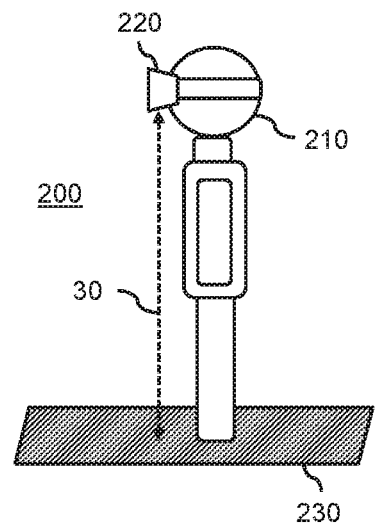
Fig. 1A
Fig. 1B

SELECTING AN OMNIDIRECTIONAL IMAGE FOR DISPLAY

CROSS REFERENCE TO RELATED APPLICATIONS

The present application claims priority to European Patent Application EP 17204834.0, which was filed in the European Patent Office on Dec. 1, 2017, and which is hereby incorporated in its entirety herein by reference.

FIELD OF THE INVENTION

The invention relates to a method of, and processor system configured for, selecting an omnidirectional image for display. The invention further relates to a computer program comprising instructions for causing a processor system to perform the method, to a database comprising a number of omnidirectional images and to metadata for an omnidirectional image. The invention further relates to a method of, and processor system configured for, displaying an omnidirectional image to a user.

BACKGROUND ART

It is known to capture an omnidirectional image of a scene and display the omnidirectional image to a user, e.g., in the form of a sequence of images (a video) or as a still image. Here, the adjective 'omnidirectional' may refer to the image providing an immersive experience when displayed to the user. A specific example is that the omnidirectional image may provide an at least 180-degree view of the scene. The omnidirectional image may even provide a larger view of the scene, e.g., a full 360 degrees, thereby providing an even more immersive experience to the user. Such types of omnidirectional images are also known as (semi-)spherical images.

Omnidirectional images may be displayed using various types of displays, such as Head-Mounted Displays (HMD), holographic displays and curved or other types of displays providing an immersive experience to the user, including but not limited to large-screen or multi-screen displays such as CAVE or IMAX cinema displays.

In general, an omnidirectional image may be a two-dimensional (2D) image but also a three-dimensional (3D) image, e.g., a stereoscopic or volumetric image.

An omnidirectional image may also be rendered in a virtual environment by means of Virtual Reality (VR) or Augmented Reality (AR) technology. Here, VR refers to the use of computer technology to simulate a users physical presence in a virtual environment, while AR refers to the use of computer technology to augment a user's view of the physical real-world environment by overlaying a virtual environment over, or in another manner combining the virtual environment with the user's view of the physical real-world environment. Rendering an omnidirectional image in a virtual or augmented environment may involve projecting the image data of the omnidirectional image onto a virtual body, such as a sphere, and rendering the projected image data from a viewpoint within or facing the virtual body to obtain a rendered image.

In general, when viewing an omnidirectional image of a scene, the user may be presented with a viewpoint of the scene which corresponds to a camera's viewpoint, being either of an actual camera or of a virtual camera in case of a rendered image. This viewpoint may not feel entirely natural. A reason for this is that the scene may contain a physical object, such as the ground floor or a wall. The same or similar type of object may also be present in the user's real-life surroundings (henceforth also referred to as 'viewing environment' or as 'environment of the user'). However, if the physical relation experienced by the user to the physical object in his/her real-life surroundings mismatches the physical relation experienced by the user to physical reference object in the displayed (virtual) scene, the user may experience a mismatch. Examples of such physical relations which may be experienced by the user include, but are not limited to, a relative position, e.g., a distance, or a relative orientation.

Namely, even if the user's view of the real-life surroundings is at least in part replaced by the display of the omnidirectional image, the user may still perceive, be aware of or experience the physical reference object in his/her real-life surroundings in other ways, e.g., from memory or by other senses than vision, e.g., touch, acoustics, proprioception, etc., and thereby consciously or unconsciously experience the mismatch.

A specific example is that the height of the camera with respect to the scene's ground floor may mismatch the current viewing height of the user in the viewing environment, as may be experienced by the user from proprioception, e.g., indicating whether the user is sitting or standing, or by the aerial perspective with respect to the scene mismatching the user's typical aerial perspective. Another specific example is that a seated user viewing an omnidirectional image acquired at a standing height may result in a mismatch between the user's various senses. This mismatch may limit the user's sense of immersion when viewing the omnidirectional image.

SUMMARY OF THE INVENTION

It would be advantageous to be able to provide a user with an omnidirectional image of a scene which provides an improved sense of immersion.

The following measures may, in some aspects of the invention, involve obtaining access to a number of omnidirectional images which each represent a different viewpoint relative to the scene, and to metadata which is indicative of a physical relation between the respective viewpoint and a physical object present in the scene. Viewer data may be obtained which is indicative of a current physical relation between a viewpoint of the user and a same type of physical object in a current viewing environment of the user. An omnidirectional image may then be selected for display by comparing the viewer data to the metadata of the omnidirectional images.

In other aspects of the invention, an omnidirectional image may have been selected, e.g., from a number of omnidirectional images or by being the only available image, and the user may be instructed to assume a viewpoint in which the physical relation to the physical object in the user's current viewing environment corresponds to the physical relation as indicated by the selected image's metadata.

In accordance with a first aspect of the invention, a method may be provided of selecting an omnidirectional image for display to a user. The method may comprise:
  obtaining access to:
    a number of omnidirectional images of a scene, wherein each omnidirectional image represents a different viewpoint relative to the scene;

for each of the images, metadata indicative of a physical relation between the respective viewpoint and a physical object present in the scene;

obtaining viewer data which is indicative of a current physical relation between a viewpoint of the user and a same type of physical object in an environment of the user;

comparing the viewer data to the metadata to identify one of the number of omnidirectional images of which the physical relation best matches the current physical relation in accordance with a match criterion; and selecting the one of the number of omnidirectional images for display.

In accordance with a further aspect of the invention, a transitory or non-transitory computer-readable medium may be provided comprising a computer program. The computer program may comprise instructions for causing a processor system to perform the method.

In accordance with a further aspect of the invention, a processor system may be provided for selecting an omnidirectional image for display to a user. The processor system may comprise:

a communication interface for obtaining access to:
  a number of omnidirectional images of a scene, wherein each omnidirectional image represents a different viewpoint relative to the scene;
  for each of the images, metadata indicative of a physical relation between the respective viewpoint and a physical object present in the scene;
a processor configured to:
obtain viewer data which is indicative of a current physical relation between a viewpoint of the user and a same type of physical object in an environment of the user;
compare the viewer data to the metadata to identify one of the number of omnidirectional images of which the physical relation best matches the current physical relation in accordance with a match criterion; and
select the one of the number of omnidirectional images for display.

The above measures may involve obtaining access to a number of omnidirectional images of a scene which may each represent a different viewpoint relative to the scene. For example, the camera may have been positioned differently when acquiring each of the omnidirectional images, or different cameras may have been used. In addition, metadata may be accessed which indicates a physical relation between the respective viewpoint of each image and a physical object present in the scene. The physical object may also be referred to as physical 'reference' object as it may act as a reference in the user's perception of his/her environment. For example, the object may define a sizable horizontal or vertical surface. Specific examples include an interior or exterior floor, an interior or exterior wall, a furniture object such as a table or a seat, etc. The physical objects may be of a 'similar' type by defining a surface having a similar orientation and/or size. For example, an interior floor may be considered a similar type of physical object as a ground floor or exterior floor, whereas an interior wall may be considered a similar type of physical object as an exterior wall.

The physical object may be visible in the omnidirectional image, e.g., in its entirety or in part, but may also be hidden yet be apparent to the user. An example of the latter is a ground floor which may be obfuscated in the omnidirectional image, e.g., by other physical objects, but which presence may be apparent to the user, e.g., from the other physical objects.

In this respect, it is noted that in case the omnidirectional image is a rendered omnidirectional image, the physical object may be contained in the rendered omnidirectional image as a virtual representation of a physical object.

The above measures may further involve obtaining viewer data which is indicative of a current physical relation between a viewpoint of the user and a same or similar type of physical object in the user's current viewing environment. For example, there may be a wall in the imaged scene, while there also may be a wall in the user's real-life surrounds. Such viewer data may be obtained in various ways, e.g., by manual input of the physical relation, by tracking of the user and/or of the physical object, etc.

In the above and following, the term 'physical relation' may refer to any experienced relation of an object to an observer, including but not limited to a relative position and a relative orientation between the user's viewpoint and the physical object. Such a relation may be expressed numerically, e.g., as a scalar or as a vector. An example of the former is the height in cm to the ground floor. An example of the latter is a 2D (e.g., X, Y) or 3D (e.g., X, Y and Z) position vector and/or orientation vector. The vector may also jointly define the relative position and relative orientation, e.g., as a 4D or 6D vector. In a specific example, such a scalar or vector may define the relative position to a horizontal surface, such as a floor or table surface or seat surface, or the relative position with respect to a vertical surface, such as a wall or fence.

The viewer data and the metadata may then be compared to identify one of the number of omnidirectional images of which, according to its metadata, the physical relation between camera viewpoint and physical object in the scene best matches the current physical relation. The 'best matching' may be quantified by a match criterion, which may objectively define a match quality. In some embodiments, the match criterion may be a complex numerical function, while in others, it may be simply the absolute difference of two scalars expressing a physical relation, e.g., a height in cm.

The above identified omnidirectional image may then be selected for display. Such selecting may involve at least generating selection data representing the selection, while another entity may actually display the omnidirectional image. In some embodiments, the display may also be carried out by the method and/or processor system, e.g., by outputting display data to a display via a display interface.

As a result of the above measures, an omnidirectional image may be selected for display which provides the user with a perspective which better matches the user's proprioceptive awareness and experience and thereby provides the user with a better sense of immersion. For example, the omnidirectional image may better match the user's current seating arrangement, his/her relative position to a table, etc.

In an embodiment, each physical relation as indicated by the metadata may be representable by a first vector, the current physical relation as indicated by the viewer data may be representable by a second vector, and the match criterion may define an equal or non-equal summed weight of the differences between respective components of said vectors which is to be applied in the comparing of the viewer data to the metadata. In case the physical relations are representable by vectors, e.g., indicating a relative distance in X, Y and Z and/or a relative orientation in Euler angles, the match criterion may simply define a non-weighted vector distance, e.g., an Euclidean distance, but may also define a weighted distance, e.g., by weighting one of the components more than another. This may allow emphasizing an aspect of the relative position and/or orientation which plays a larger role in the user's proprioceptive awareness and experience and thereby results in an omnidirectional image being selected of which its camera viewpoint provides a better sense of immersion. A specific example is that a correspondence in height, e.g., relative vertical position, to the physical object may outweigh a correspondence in relative horizontal position. In a more specific example, a correspondence between the user viewpoint's height to the floor may be deemed more important than a user viewpoint's distance to a wall.

In an embodiment, obtaining the viewer data may comprise:
  tracking the user in the environment to obtain tracking data indicative of a position and/or orientation of the user in the environment;
  obtaining object data indicative of the position and/or orientation of the physical object in the environment; and
  processing the tracking data and the object data to determine the current physical relation between the user and the physical object.

In an embodiment, obtaining the viewer data may comprise using a user input interface to obtain a manual selection or manual specification of the current physical relation to the physical object. For example, the manual selection or manual specification may be of at least one of the group of: a viewing height, a seating arrangement and a standing arrangement of the user. Such selection or specification may involve selecting between a seating arrangement and a standing arrangement, or selecting a type or parameters of the seating arrangement or standing arrangement.

In a further aspect of the invention, a method may be provided of acquiring an omnidirectional image of a scene. The method may comprise:
  acquiring the omnidirectional image from a viewpoint relative to the scene;
  determining a physical relation between the respective viewpoint and a physical object in the scene, wherein the physical relation to the physical object comprises at least one of the group of:
    a position with respect to a horizontal surface, such as a floor or table surface or seat surface,
    a position with respect to a vertical surface, such as a wall or fence; and
  generating metadata indicative of the physical relation.

The method may thus provide an omnidirectional image with metadata which indicates a physical relation between the respective viewpoint at which the omnidirectional image is acquired and a physical object in the scene, with the physical relation being specifically a relative position with respect to a horizontal surface or a vertical object of an object. Such a relative position may be determined in various ways, e.g., by manual selection or specification by a user, but also automatically, e.g., using image recognition techniques, object tracking techniques, distance and/or height measurement techniques as known per se.

In a further aspect of the invention, a database may be provided which may comprise any of the above described number of omnidirectional images of a scene and said metadata. The database may further comprise index data providing an index to the omnidirectional images on the basis of the physical relation. Here, the term 'database' may refer to any organized collection of data, and may involve centralized storage, e.g., by a single apparatus, but also to a distributed or decentralized storage.

In a further aspect of the invention, the above or below described metadata may be provided on a transitory or non-transitory computer-readable medium.

In a further aspect of the invention, a processor system may be provided for displaying an omnidirectional image of a scene to a user. The processor system may comprise:
  a communication interface for obtaining access to:
    the omnidirectional image of the scene, wherein the omnidirectional image represents a viewpoint relative to the scene;
    metadata indicative of a physical relation between the respective viewpoint and a physical object present in the scene;
  a display interface configured to output display data representing the omnidirectional image to a display; and
  a user output interface configured to convey instructions to the user to assume a viewpoint in which a physical relation to a same type of physical object in an environment of the user corresponds to the physical relation as indicated by the metadata.

In a further aspect of the invention, a method may be provided of displaying an omnidirectional image of a scene to a user. The method may comprise:
  obtaining access to:
    the omnidirectional image of the scene, wherein the omnidirectional image represents a viewpoint relative to the scene;
    metadata indicative of a physical relation between the respective viewpoint and a physical object present in the scene;
  outputting display data representing the omnidirectional image to a display; and
  conveying instructions to the user to assume a viewpoint in which a physical relation to a same type of physical object in an environment of the user corresponds to the physical relation as indicated by the metadata.

The above measures may be performed alternatively or additionally to selecting a 'best matching' omnidirectional image from a number of omnidirectional images. Namely, having selected such an omnidirectional image in any known manner, or alternatively having only one omnidirectional image available, the user may be instructed to assume a viewpoint in which the physical relation to the physical object in the user's current viewing environment corresponds to the physical relation as indicated by the omnidirectional image's metadata. For example, the instructions may indicate a viewing height, a seating arrangement or a standing arrangement to be assumed by the user. This may (further) improve the user's sense of immersion when viewing the omnidirectional image. Such instructions may be conveyed to the user in various forms, including but not limited to such conveying via a display interface, e.g., by including the instructions as text or graphical elements into the display data, or by providing a verbal instruction.

In an embodiment, the user output interface may be configured to convey the instructions to the user via the display interface by including the instructions as text or graphical elements into the display data.

In an embodiment, the instructions may indicate at least one of the group of: a viewing height, a seating arrangement and a standing arrangement of the user.

It will be appreciated by those skilled in the art that two or more of the above-mentioned embodiments, implementations, and/or aspects of the invention may be combined in any way deemed useful.

Modifications and variations of any of the described processor systems, methods, computer programs and computer readable media which correspond to the described modifications and variations of any another of these entities, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings, FIG. 1A illustrates a scene capture from different camera viewpoints, each having a different vertical position with respect to the ground floor of the scene;

FIG. 1B illustrates a user in his/her viewing environment, with the user standing in the viewing environment and thereby having a viewpoint at a particular vertical position with respect to the ground floor in the viewing environment;

Figure 2A:
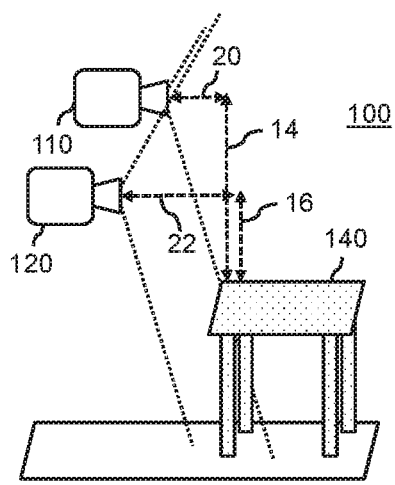
FIG. 2A illustrates a scene capture from different camera viewpoints, each having a different horizontal and/or vertical position with respect to a table in the scene.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

10-16 vertical relative position
20-22 horizontal relative position
30, 32 vertical relative position
40 horizontal relative position
60 user input device
62 user input data
80 display
100 scene
110, 120 camera
130 ground floor
140 table
200 viewing environment
210 user
220 head mounted display
230 ground floor
240, 242 table
250 chair
260 wall
300 capture side
302 capture device
304 metadata generator
306 metadata inserter
308 indexer
310 images+metadata
320 database
330 images+metadata access
340 display side
342 user & HMD tracker
344 environment tracker
346 user configuration
350 user & environment information
360 image selector
370 selected image
380 image displayer
390 displayed image
410 capture omnidirectional image
420 determine capture height
430 insert metadata
440 create index
450 select scene
460 determine HMD height
470 select best matching image
480 display image
500 processor system
510 communication interface
512 image data, metadata
520 processor
522 image data
530 display interface
532 display data
540 user input interface
542 user input data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

In the following, embodiments are described which involve selecting an omnidirectional image for display of which, according to its metadata, the physical relation between camera viewpoint and a physical object in the imaged scene best matches a current physical relation between a user's viewpoint in his/her current viewing environment and a same or similar type of physical object in said environment.

Other types of embodiments involve or relate to the acquiring of the omnidirectional images and/or the generating of the metadata, and/or to the user being instructed to assume a viewpoint in which the user's physical relation to the physical object corresponds to the physical relation indicated by the selected image's metadata.

FIGS. 1A-2B provide an illustration of a number of these embodiments. Here, the context is a user viewing a 360-degree omnidirectional image in Virtual Reality (VR), and specifically using an Head Mounted Display (HMD). However, the inventive concept behind the embodiments is not limited to such type of display, but rather to all types of display and viewing and all types of omnidirectional images.

When wearing an HMD and being presented with a 360-degree omnidirectional image, e.g., a still photo or rendered image or a video presented in 2D or stereoscopic 3D, the user may be provided with a sense of being somewhere else, namely in the scene imaged by the omnidirectional image. A reason for this is that the user may look around in the scene as if the user were physically present in the scene. This sense of immersion has been found to work well when the user views objects in the scene which are far removed from the camera viewpoint, e.g., shown in a distance. However, if objects are nearby the camera viewpoint, the position of the camera viewpoint within the scene becomes relevant for the user's sense of immersion.

Consider for example the height of the camera: a tall person viewing the immediate surroundings in the imaged scene from a too short distance from the ground, or vice versa, may yield an unnatural experience and thereby reduce or diminish the user's sense of immersion. Another example is that of the user standing in his/her viewing environment, yet being provided with a view of a scene from a seated position, possibly even showing a chair below the camera viewpoint. It has been found that small differences between the physical position of the user in his/her viewing environment and the 'virtual' position provided by the camera viewpoint in the image scene may already be important for the user's sense of immersion. For example, if the user is sitting in his/her viewing environment on a chair but is shown the scene from the perspective of a couch, this relatively small mismatch in height may already be perceivable and thereby reduce the user's sense of immersion in the scene.

In general, it has been found that the user's sense of immersion is dependent on how he/she experiences the physical relation to a physical object in the scene, versus the physical relation to a same or similar type of physical object in the user's current viewing environment. In the case of the camera height, the physical object may be the ground floor, e.g., of a building, structure or the 'earth' floor. However, the physical object may also be a furniture object, a wall, a fence, etc.

FIGS. 1A and 1B further illustrate the above example of the height of the camera. In this example, and as also shown in FIG. 1B, the user 210 may be standing in a viewing environment 200 on a ground floor 230 while wearing an HMD 220 which may comprise or be connected to a processor system (not shown in FIG. 1B) and which may be configured for displaying an omnidirectional image of a scene. Examples of such processor systems will be explained with reference to FIG. 7 and others.

The displayed omnidirectional image may have been captured by a camera 120 as shown in FIG. 1A. Here, the camera 120 is shown to have a certain capture height 12 with respect to the ground floor 130 of the scene 100. This capture height 12 may mismatch the viewing height 30 of the user 210 of FIG. 1B. For example, the camera 120 may be positioned too low, e.g., too near to the ground floor 130. Accordingly, if the user were to view the omnidirectional image captured by the camera 120, he/she may not feel fully immersed in the scene 100. However, in this embodiment, multiple omnidirectional images may have been captured from different viewpoints within the scene 100, which, as in the example of FIG. 1A, may comprise the use of another camera 110 but may also involve the use of a single camera which may be repositioned within the scene 100.

It can be seen that the camera 110 is positioned further from the ground floor 130 than the earlier mentioned camera 120, e.g., at a capture height 10 which is larger than the capture height 12. As the capture height 10 is more similar to the viewing height 30 of the user 210 than the capture height 12, the camera viewpoint of camera 110 may provide a better sense of immersion to the user 210. Accordingly, the omnidirectional image obtained by camera 110 may be selected for display to the user 210.

In some embodiments, omnidirectional images may be purposefully captured from different camera viewpoints within a scene and metadata may be generated which may be indicative of these camera viewpoints. In other embodiments, an omnidirectional image may be selected from such a number of omnidirectional images which, according to a match criterion, is deemed to provide a best sense of immersion to the user.

Figure 2B:
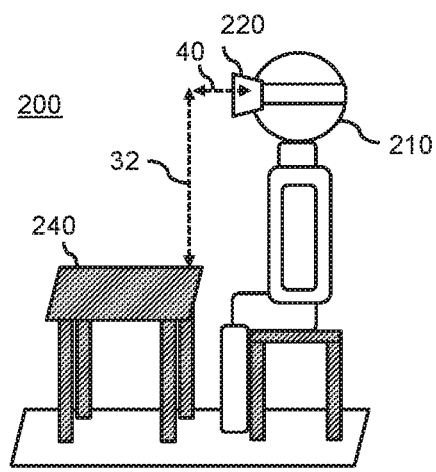
FIG. 2B illustrates a user in his/her viewing environment, with the user having a viewpoint at a particular horizontal and vertical position with respect to a table in the viewing environment.

FIGS. 2A and 2B are similar to FIGS. 1A and 1B but illustrate that the sense of immersion may not only be dependent on the difference in height between the camera viewpoint and the user's viewpoint, but also on a difference in position to another type of physical object in the scene/viewing environment, being in this example a table.

Namely, FIG. 2B shows the viewing environment 200 of the user 210 comprising a table 240, with the user 210 in this example sitting at the table 240. Despite wearing the HMD 220, the user 210 may still experience the table 240, e.g., from memory or from other senses such as touch. The user 220 may also experience his/her sitting height, e.g., from the assumed pose. FIG. 2A shows the imaged scene 100 also comprising a table 140, which may be imaged from two different camera viewpoints, namely by a camera 110 and by a camera 120. It can be seen that the camera 110 may provide a more optimal perspective of the scene 100, and in particular of the table 140 within the scene 100, as its relative position to the table 140 in terms of capture height 14 and horizontal capture distance 20 is more similar to the viewing height 32 and the horizontal viewing distance 40 of the user 210 than the capture height 16 and horizontal capture distance 22 of the camera 120. Accordingly, the omnidirectional image obtained by camera 110 may be selected for display.

Figure 3:
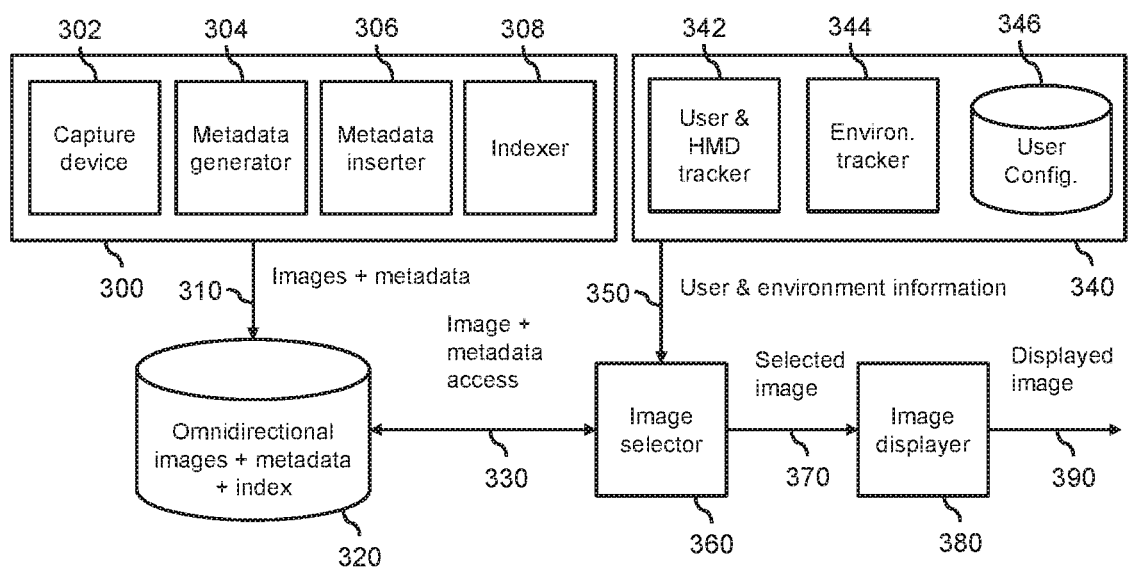
FIG. 3 shows functional units and dataflows in a detailed embodiment.

FIG. 3 shows a detailed embodiment which includes functional units at a capture side 300 and at a display side 340. Namely, at the capture side 300, a capture device 302 such as a camera may capture an omnidirectional image (which is in FIG. 3 simply denoted as 'image') of a scene. A metadata generator 304 may then generate metadata which is indicative of a physical relation between the camera's viewpoint and a physical object present in the scene. Optionally, the metadata may be inserted by a metadata inserter into a data structure, such as a header of the image data, a separate file, etc. The above may be repeated for different camera viewpoints, thereby obtaining a number of omnidirectional images and corresponding metadata 310 which may be stored in a database 320. Optionally, index data may be generated by an indexer 308 so as to provide an index to the omnidirectional images in the database 320 on the basis of the physical relation to the physical object.

At the display side 340, user and environment information may be detected so as to determine a physical relation between the user's viewpoint in his/her current viewing environment and a physical object present in the current viewing environment. Such user and environment information may thereby represent 'viewer data' as referred elsewhere, e.g., data which is indicative of a current physical relation between a viewpoint of the user and a same type of physical object in an environment of the user. Such viewer data may explicitly define this relation, but may also be comprised of data which indirectly indicates the relation, e.g., by comprising first (user) data defining the position and/or orientation of the user in the viewing environment and second (object) data defining the position and/or orientation of the object in the viewing environment.

Obtaining the user and environment information may comprise manual selection or specification of the user's position and/or orientation in the viewing environment, which in some embodiments may be selected or specified directly in relation to the physical object, e.g., by the user selecting in a user interface a user configuration 346 such as 'seated on a chair'. Alternatively, obtaining the user and environment information may comprise tracking the user in his/her viewing environment, e.g., using a user & HMD tracker 342, thereby obtaining user tracking data. The position and/or orientation of the physical object may also be manually selected or specified, or may be obtained by tracking the physical object in the viewing environment, e.g., using an environment tracker 344, thereby obtaining object tracking data. It is noted that various other options of obtaining the user and environment information, e.g., the viewer data, are described onwards in this specification.

Based on the user & environment information 350 and the metadata stored in the database 320, an image selector 360 may then select the most appropriate omnidirectional image, e.g., via access 330 to the database and by making use of a match criterion as described onwards in this specification. The selected image 370 may then be displayed by an image displayer 380, yielding a displayed image 390.

With further reference to the capture side 300, it is noted that the omnidirectional image may be captured in various ways as known per se in the art of omnidirectional image generation. For example, a 360-degree camera may be used having a 360-degree field of view. Alternatively, a camera having a regular field-of-view may be used to obtain several images which may then be stitched together. It is noted that the omnidirectional image may not need to be 'complete'. For example, the omnidirectional image may provide a 360-degree view along the horizontal direction but may omit the top/down direction, or only 180 degrees may be captured.

With further reference to the metadata, such metadata may take various forms. For example, use may be made of the spherical metadata syntax as described in [2], according to which the metadata may take the following form, for example describing a height from ground as a scalar, e.g., in cm, and indicating a context of the height, e.g., by indicating that there is a chair in the scene below the camera viewpoint:

```
<GPano:PoseHeightFromGround>180</GPano:PoseHeightFromGround>
<GPano:PoseContextBelow>chair</GPano:PoseContextBelow>
```

The metadata as described in this specification may also be embodied by EXIF data [3] or as MPEG-7 or MPEG-21 metadata. As will be understood, the metadata fields may have a different syntax than the descriptive examples above and may or may not be human readable or in machine code. The term 'pose' may be used to indicate a relative viewpoint including viewing height, distance and/or orientation. Alternatively or additionally, one or more separate metadata fields may be used to indicate viewing position (height and/or distance), and/or viewing orientation.

The earlier described index may be generated by an indexer, e.g., the indexer 308, for example in XML comparable with an MPEG-DASH MPD:

```
<Representation mimeType="image/png" width="7680" height="3840"
poseHeightFromGround="180" poseContextBelow="empty">
    <URL> image_8K_02.png</URL>
</Representation>
<Representation mimeType="image/png" width="7680" height="3840"
poseHeightFromGround="160" poseContextBelow="empty">
    <URL> image_8K_04.png</URL>
</Representation>
<Representation mimeType="image/png" width="7680" height="3840"
poseHeightFromGround="140" poseContextBelow="chair">
    <URL> image_8K_06.png</URL>
</Representation>
<Representation mimeType="image/png" width="7680" height="3840"
poseHeightFromGround="120" poseContextBelow="chair">
    <URL> image_8K_08.png</URL>
</Representation>
```

The metadata may be generated, and optionally inserted, in various ways. For example, the metadata may be obtained from input by a user using a software tool, e.g., an authoring tool. For example, a content creator may manually specify the camera height and placement using, e.g., a known EXIF editor software. The metadata may also be generated by the camera itself, e.g., using sensors included in the camera. The metadata may also be generated by image analysis. For example, when using a depth camera or a stereo camera, the distance to the floor may be determined automatically. Also other types of physical objects, such as a chair or a couch, may be recognized using computer vision technology, which may then allow the physical relation to the camera viewpoint, e.g., the relative distance, to be determined.

At the display side, the viewer data may be obtained by various ways. For example, the user may be tracked in his/her viewing environment, e.g., using a video camera or depth camera such as the Microsoft Kinect or a stereo camera which may record the user, with the user's height and his/her position being determined from the captured data [5], e.g., by detecting skeletal joints and their position and derive the height and position from this information. Similarly, a seating configuration, e.g., chair, couch, barstool, seat height, etc., may be detected this way. Another option is to have the user manually select or specify his/her height while assuming an average distance between the user's top of the head and his/her eyes. The user may also directly specify his/her viewing height in the viewing environment by manual selection or specification.

If it is needed to separately determine the position and/or orientation of the physical object in the user's current viewing environment, such (environment) information may also be obtained in various ways. For example, it is known to determine the floor level using an HMD or VR controller. Namely, the user may simply place the HMD or VR controller on the floor within the field of view of an external tracker, such as for example a HTC Lighthouse or Oculus Tracker camera. The user may also trace the border of his/her VR space, e.g., which may be formed by one or more physical walls, with the VR controller, thereby indicating their location.

The image selector, or in general the selection of the omnidirectional image from a number of omnidirectional images, may employ a match criterion to determine a 'best match' between a) the camera viewpoint in the scene with respect to a physical object, and b) the viewpoint of the user in his/her current viewing environment in regards to a same or similar type of physical object. For example, if the physical object is the ground floor, the metadata may simply define a height of the camera viewpoint with respect to the ground floor in the scene whereas the viewer data may define the height of the user's viewpoint with respect to the ground floor in his/her viewing environment. The match criterion may here simply define an absolute difference between both values, with a smaller absolute difference indicating a better match.

If the physical relation is represented or representable by a vector rather than a scalar, the match criterion may define an Euclidean distance, e.g., an equal weighting of the difference along each dimension of the vector, with a smaller difference indicating a better match. The match criterion may also be defined to weigh the vector components in a non-equal manner, e.g., by emphasizing a correspondence in vertical position, e.g., height, over a correspondence in horizontal position, by emphasizing a correspondence in position over a correspondence in orientation, etc.

It is further noted that instead of selecting the best match according to the match criterion, it may also be possible to select 'second best' match or in general a match which may establish a certain difference. An example is that it may be desired to present the user with a camera viewpoint which is deliberately slightly below or above the user's height. Namely, although it may normally be desired to provide a most realistic perspective to the user, it may in some embodiments also be desired to provide a less realistic perspective. For example, in a gaming context, it may be desired to provide the user the perspective of a giant or dwarf. In another example, it may be possible to provide the user with the perspective of a child, e.g., to evaluate reachability of cabinets in a kitchen from the perspective of a child. Any reference to 'optimal' and 'best matching' may thus include taking into account the use-case of the presentation of the omnidirectional image, in that the selection of the omnidirectional may not only be based on a closest correspondence in physical relation, but also additionally incorporate one or more user-case consideration. Such considerations may be incorporated in the selection by suitably defining the match criterion.

Figure 4:
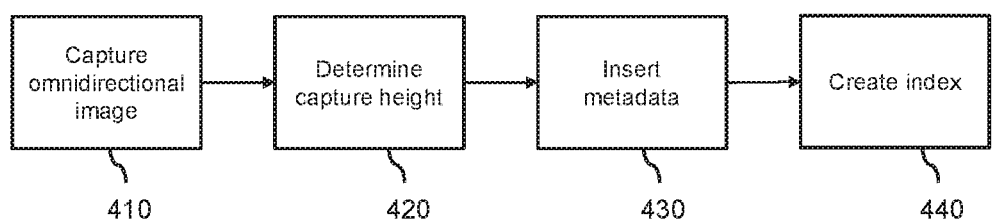
FIG. 4 illustrates a capture process.

FIG. 4 illustrates a specific embodiment in which a user may first capture 410 an omnidirectional image, e.g., by using a 360-degree camera to capture several spherical images of a scene. The user may use a tripod to steady the camera, and for each captured omnidirectional image, the user may determine 420 the capture height, e.g., by measuring the height of the camera, e.g., the height of the center of the horizontally faced lenses. After acquiring the images, the user may transfer the images to a PC. On the PC, the user may manually insert 430 the height into the spherical metadata already provided by the camera, e.g. using ExifTool [6]. After adding the height and possibly other context information for each image, the user may run an indexer program or script to create 440 an index file for all the images of this scene.

Figure 5:
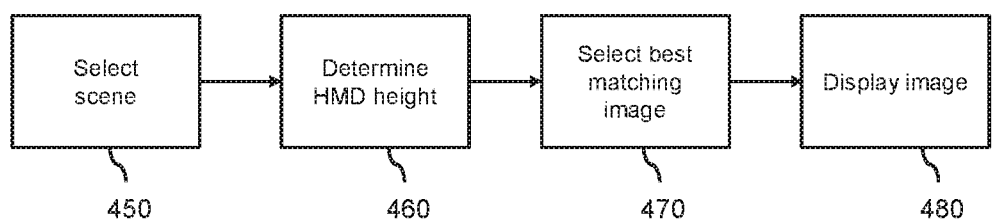
FIG. 5 illustrates the selection of an omnidirectional image.

FIG. 5 illustrates a specific embodiment involving the selection of one of the omnidirectional images for display. In this embodiment, the user may use a PC and a connected HMD. By using a viewer application, he/she may select 450 a 360-degree scene for viewing. The various images of the scene, their metadata and an index may be stored on the PC. After the user's selection, the viewer application may determine 460 the current height of the HMD, e.g., using existing HMD software capabilities. The viewer application may then select 470 the appropriate image for the measured height using the index. The selected image may then be displayed 480 on the HMD.

Figure 6:
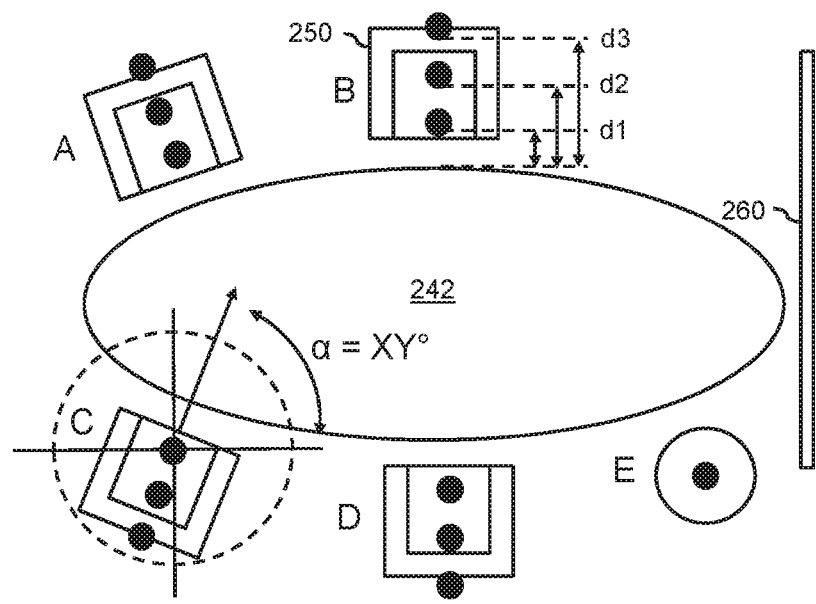
FIG. 6 shows an embodiment in a VR conferencing context.

FIG. 6 shows a specific embodiment in a VR conferencing context. Such VR conferencing involves the use of a VR environment, which is in the context of VR also simply referred to as 'virtual environment', for multiuser communication. In such multiuser communication, users may be represented by avatars within the virtual environment, while communicating via voice, e.g., using a microphone and speakers, via video, e.g., using a camera and an avatar which is based on the video, and/or nonverbal communication. Here, the term 'avatar' refers to a representation of the user within the virtual environment, which may include representations as real or imaginary persons, real or abstract objects, but also as a 'virtual display' showing video of the user. Such VR environment-based multiuser communication is known per se.

The virtual environment may show a scene which is represented by one or more omnidirectional images, and thereby by image data rather than by computer graphics. As the different users may be placed at different positions within the scene, multiple images of the same scene may be needed so as to provide each user with a view of the scene which corresponds to his/her position within the scene. For example, FIG. 6 shows a top-down view of a scene in which users A-E are virtually placed at a table 242 facing a wall 260 on which a virtual display may be shown (not shown in FIG. 6). Users A-D may in real-life be sitting, whereas user E may be standing, e.g., to present. To provide each user with an immersive view of the scene, multiple omnidirectional images of the scene may be generated. For example, for the position of user B, multiple omnidirectional images may be generated which correspond to different heights for a seated user, e.g., at 10 cm intervals between 1 m10 and 1 m40, and at different distances from the table 242, e.g., at distances d1, d2 and d3. This may thus involve generating images at 4 different heights and 3 different horizontal positions, equaling 12 different images. Also, metadata may be generated for each of the images indicating its camera position with respect to the chair 250 and table 242.

Viewer data of user B may then be obtained which is indicative of user B's physical relation to a chair and table or desk in his current real-life viewing environment, e.g., indicating the actual sitting height of user B and his/her distance to the table or desk. This viewer data may be obtained in a manner as previously described. For example, the video data of a camera recording user B for the VR conference may be analyzed by image analysis or computer vision techniques to determine user B's physical relation to the chair and table. Alternatively, the camera recording user B may be fixed to the table or desk, and the relative position and orientation of the camera may be configured beforehand. In such a case, only position and orientation of the user may need to be tracked. Having obtained the viewer data and having access to the metadata of the 12 different images, one of the images may be then selected for display to user B which shows the table 242 from the most realistic perspective.

Furthermore, as also indicated for user C, the metadata may define, for each of the directional images, the orientation of the camera viewpoint relative to the table 242, e.g., angle α. This may be done using GPano:InitialViewHeadingDegrees from [2]. It is noted that this usage changes the meaning of this property somewhat; it is now not the initial view, but the initial view if the user is facing the table straight-on.

Figure 7:
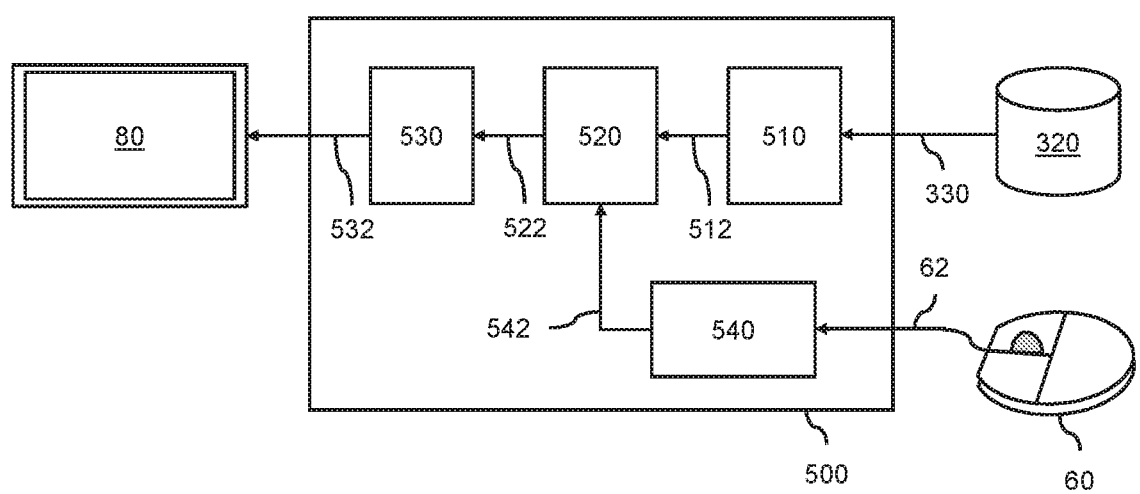
FIG. 7 shows an exemplary processor system.

FIG. 7 shows a processor system 500 which may be exemplary for processor systems as described in this specification. The processor system 500 is shown to comprise a communication interface 510, a processor 520 and, as optional components, a display interface 530 and a user input interface 540.

In an embodiment, the processor system 500 may be configured for selecting an omnidirectional image for display to a user. In this embodiment, the communication interface 510 may provide access to a number of omnidirectional images of a scene, wherein each omnidirectional image represents a different viewpoint relative to the scene, and for each of the images, access to metadata indicative of a physical relation between the respective viewpoint and a physical object present in the scene. For example, the omnidirectional images and the metadata 330 may be stored in a database 320, or in any other type of storage accessible via the communication interface 510, such as a local or remote centralized or distributed storage. For example, the communication interface 510 may be a communication interface to an internal bus or an external bus such as a Universal Serial Bus (USB). Alternatively, the communication interface 510 may be a network interface, including but not limited to a wireless network interface, e.g., based on Wi-Fi, Bluetooth, ZigBee, 4G mobile communication or 5G mobile communication, or a wired network interface, e.g., based on Ethernet or optical fibre. For example, the network interface may be to a local area network (LAN) network or to a wide area network (WAN), e.g., the Internet.

The processor 520 may be configured, e.g., by hardware design or software, to perform the operations described in relation to the selecting of one of the omnidirectional images for display. For example, the processor 520 may be embodied by a single Central Processing Unit (CPU), but also by a combination or system of such CPUs and/or other types of processing units. FIG. 7 further shows the processor system 500 comprising a display interface 530, which may output display data 532 representing the selected omnidirectional image 522 to a display 80, such as a HMD. Also shown is a user input interface 540, which may be connected to a user input device 60 such as a computer mouse, keyboard, touch interface, voice interface, etc. Using the user input device 60, the user may provide input to the processor system 500, e.g., to manually select or specify parameters such as a current physical relation to a physical object. The received user input data 62 may then be transmitted by the user input interface 540 as internal user input data 542 to the processor 520.

In a same or another embodiment, the processor system 500 may be configured for displaying an omnidirectional image of a scene to a user. In this embodiment, the communication interface 510 may provide access to at least one omnidirectional image of the scene and its metadata, and the display interface 530 may be configured to output display data 532 representing the omnidirectional image to the display 80. Although not shown explicitly in FIG. 7, a user output interface may further be provided to convey instructions to the user to assume a viewpoint in which a physical relation to a same type of physical object in an environment of the user corresponds to the physical relation as indicated by the metadata. In some embodiments, the user output interface may be embodied by the display interface 530, whereas in others, a separate user output interface may be provided, which may be configured to provide the instructions as speech, tactile feedback, light signals etc.

In general, the processor system 500 may be embodied by a (single) device or apparatus. For example, the processor system 500 may be embodied as a VR device, AR device, smartphone, personal computer, laptop, tablet device, gaming console, set-top box, television, monitor, projector, smart watch, smart glasses, media player, media recorder, etc. The processor system 500 may also be embodied by a distributed system of such devices or apparatuses, which may include network elements in a network. For example, parts of the processor system 500 may be embodied by a server or an edge node such as a 5G Mobile Edge Computer (MEC).

In general, the processor system 500 of FIG. 7 may be embodied as, or in, a device or apparatus. The device or apparatus may comprise one or more (micro)processors which execute appropriate software. Software implementing the functionality of the processor system may have been downloaded and/or stored in a corresponding memory or memories, e.g., in volatile memory such as RAM or in non-volatile memory such as Flash. Alternatively, the functionality may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of the processor system may be implemented in the form of a circuit. It is noted that the processor system may also be implemented in a distributed manner, e.g., involving different devices or apparatuses.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium, e.g., in the form of a series of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

General Remarks

Instead of capturing a number of omnidirectional images at different camera positions, such different camera positions may be synthetically generated from one omnidirectional image by applying image transformation to the omnidirectional image, e.g., using so-termed virtual pan/tilt/zoom as described by [7] or similar techniques.

The number of omnidirectional images of the scene may also be generated from one or more volumetric or light field captures of a scene.

Instead of still images, omnidirectional video may be captured, or a combination of a still image and a video, e.g. image of a beach and video of the sea.

Instead of selecting an omnidirectional image from a number of omnidirectional images of a scene, also a scene may be selected of which the collection of omnidirectional images pertaining to the scene comprises an omnidirectional image of which the camera position best matches the current viewing position of the user, e.g., select a best 'beach view' from several 'beach views' scenes.

The number of omnidirectional images may pertain to different sitting arrangements, e.g. chair, couch, barstool, with the sitting arrangement being indicated in the metadata of each respective image. The scene may also be recorded without sitting arrangement, with the sitting arrangements then being inserted later on, e.g., by inserting an image of a chair, couch or barstool into an omnidirectional image.

The metadata may be included in a database. The metadata may link to the respective omnidirectional image. The metadata may also be included in a filename, header or other part of the data structure of an omnidirectional image.

Many embodiments refer to the physical relation being a relative position. However, the inventive concept also applies to the physical relation being, or additionally comprising, a relative orientation. For example, metadata may define the relative orientation of a camera viewpoint to a physical object, with an omnidirectional image then being selected on the basis of the user having a similar orientation to a same or similar type of physical object in his/her current viewing environment. The relative position may include 3 axes for all 3 directions, and the relative orientation may include 3 axes for rotations in all directions, e.g., a full 6 degrees of freedom.

With further reference to instructing a user assume a viewpoint, the following example may serve as an elucidation. A user may watch a 360-video documentary about the US desert. The user may be sitting in his/her real-life viewing environment, and the video may show a scene driving in a car in the US desert. During the video, there may be a scene cut, e.g., to a mountain top scene. While the video blends over to the mountain top scene, the metadata in the video may indicate that the camera perspective is changing to a standing position. As the perspective of the user is currently mismatching, e.g., the user is sitting instead of standing, the user may be presented with an overlay indicating the user to stand up. This (non-intrusive) overlay may be shown until the user is standing. Alternatively, instead of an overlay, any other sensory perceptible notification may be used. Alternatively, the scene may not change until the user is standing. Once standing, the mountain top scene may appear more immersive to the user. Later on, there may be a scene cut back to the car. The user may again be instructed to change position, e.g., to a sitting position, etc.

With respect to the relative position, such a relative position may be preferably defined and measured with respect to the center of the camera lens and with respect to the center of the user's viewing position, e.g., corresponding to a position between his/her eyes. However, the relative position may also be defined and/or measured differently, e.g., with respect to, e.g., a bottom part of the camera, a top of the head of the user, etc. This may still provide an adequate approximation of said preferred definitions and/or measurements of the relative position.

Figure 8:
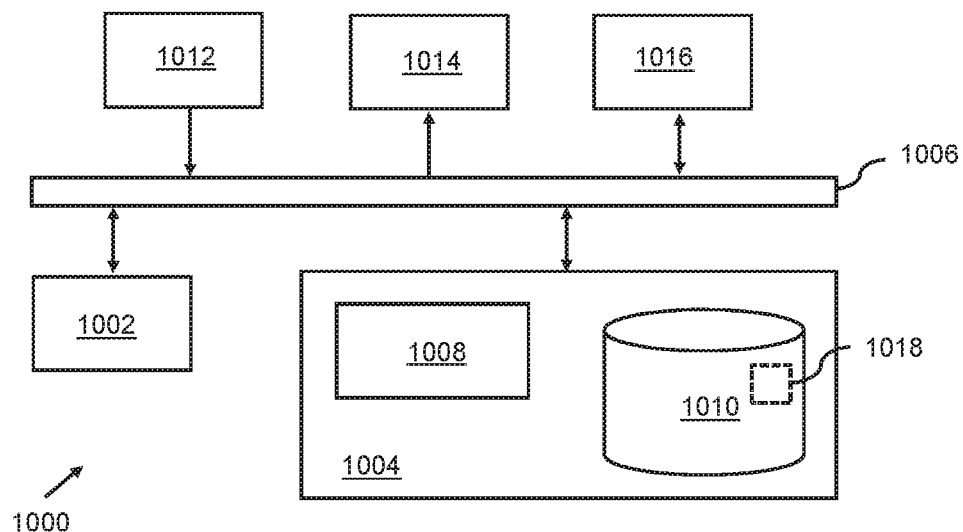
FIG. 8 shows an exemplary data processing system.

FIG. 8 is a block diagram illustrating an exemplary data processing system that may be used in embodiments described in this specification. Such data processing systems include data processing entities described in this specification, including but not limited to processor systems, image selectors, metadata generators etc.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 8, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent any data processing entity described in this specification, e.g., a processor system, an image selector, a metadata generator, etc. In that case, application 1018 may represent an application that, when executed, configures data processing system 1000 to perform the functions described herein with reference to said entity.

REFERENCES

[1] Cutting, J. E. (1997). How the eye measures reality and virtual reality. Behavior Research Methods, 29(1), 27-36.

[2] https://developers.google.com/streetview/spherical-metadata

[3] Camera & Imaging Products Association, Exchangeable image file format for digital still cameras: Exif Version 2.31, July 2016

[4] Tanimoto, M. (2012). FTV: Free-viewpoint television. Signal Processing: Image Communication, 27(6), 555-570

[5] https://msdn.microsoft.com/en-us/library/jj131025.aspx

[6] https://facebook360.fb.com/editing-360-photos-injecting-metadata/

[7] Maviankar, Aditya, et al. "Optimal slice size for streaming regions of high resolution video with virtual pan/tilt/zoom functionality." *Signal Processing Conference, 2007 15th European*. IEEE, 2007.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of selecting an omnidirectional image for display to a user, the method comprising:
   obtaining access to:
      a number of omnidirectional images of a scene, wherein each of the omnidirectional images represents a different respective viewpoint relative to the scene;
      for each of the omnidirectional images, metadata indicative of a physical relation between a capture height of the respective viewpoint and a physical object present in the scene, wherein the metadata is part of a data structure of the omnidirectional image;
   obtaining viewer data which is indicative of a current physical relation between a viewing height of a viewpoint of the user and a same type of physical object in an environment of the user that is different from the scene;
   comparing the viewer data to the metadata to identify one of the number of omnidirectional images of which the physical relation best matches the current physical relation in accordance with a match criterion; and
   selecting the one of the number of omnidirectional images for display.

2. The method according to claim 1, wherein the physical relation consists of at least one of the group of: a relative position or a relative orientation.

3. The method according to claim 1, wherein the physical relation to the physical object consists of at least one of the group of:
   a position with respect to a horizontal surface; or
   a position with respect to a vertical surface.

4. The method according to claim 1, wherein:
   each physical relation as indicated by the metadata is represented by a first vector;
   the current physical relation as indicated by the viewer data is represented by a second vector; and
   the match criterion defines an equal or non-equal summed weight of the differences between respective components of the first and second vectors which is to be applied in the comparing of the viewer data to the metadata.

5. The method according to claim 1, wherein obtaining the viewer data comprises:
   tracking the user in the environment to obtain tracking data indicative of a position and/or orientation of the user in the environment;
   obtaining object data indicative of the position and/or orientation of the physical object in the environment; and
   processing the tracking data and the object data to determine the current physical relation between the user and the physical object.

6. The method according to claim 1, wherein obtaining the viewer data comprises using a user input interface to obtain a manual selection or manual specification of the current physical relation to the physical object.

7. The method according to claim 6, wherein the manual selection or manual specification is of at least one of the group of: a viewing height, a seating arrangement or a standing arrangement of the user.

8. A method of acquiring an omnidirectional image of a scene, the method comprising:
   acquiring the omnidirectional image from a viewpoint relative to the scene;
   determining a physical relation between a capture height of the respective viewpoint and a physical object in the scene, wherein the physical relation to the physical object is at least one of the group of:
      a position with respect to a horizontal surface, or
      a position with respect to a vertical surface; and
   generating metadata indicative of the physical relation, wherein the generated metadata is included in a data structure of the omnidirectional image.

9. A non-transitory computer-readable medium comprising having instructions stored thereon that, when executed by one or more processors of a system, cause the system to carry out operations including:
   obtaining access to:
      a number of omnidirectional images of a scene, wherein each of the omnidirectional images represents a different respective viewpoint relative to the scene;
      for each of the omnidirectional images, metadata indicative of a physical relation between a capture height of the respective viewpoint and a physical object present in the scene, wherein the metadata is part of a data structure of the omnidirectional image;
   obtaining viewer data which is indicative of a current physical relation between a viewing height of a viewpoint of a user and a same type of physical object in an environment of the user that is different from the scene;
   comparing the viewer data to the metadata to identify one of the number of omnidirectional images of which the physical relation best matches the current physical relation in accordance with a match criterion; and
   selecting the one of the number of omnidirectional images for display.

10. The non-transitory computer-readable medium according to claim 9, wherein the physical relation consists of at least one of the group of: a relative position or a relative orientation.

11. The non-transitory computer-readable medium according to claim 9, wherein the physical relation to the physical object consists of at least one of the group of:
   a position with respect to a horizontal surface; or
   a position with respect to a vertical surface.

12. The non-transitory computer-readable medium according to claim 9, wherein:
   each physical relation as indicated by the metadata is represented by a first vector;
   the current physical relation as indicated by the viewer data is represented by a second vector; and
   the match criterion defines an equal or non-equal summed weight of the differences between respective components of the first and second vectors which is to be applied in the comparing of the viewer data to the metadata.

13. The non-transitory computer-readable medium according to claim 9, wherein obtaining the viewer data comprises:

tracking the user in the environment to obtain tracking data indicative of a position and/or orientation of the user in the environment;

obtaining object data indicative of the position and/or orientation of the physical object in the environment; and processing the tracking data and the object data to determine the current physical relation between the user and the physical object.

14. The non-transitory computer-readable medium according to claim 9, wherein obtaining the viewer data comprises using a user input interface to obtain a manual selection or manual specification of the current physical relation to the physical object.

15. The non-transitory computer-readable medium according to claim 14, wherein the manual selection or manual specification is of at least one of the group of: a viewing height, a seating arrangement or a standing arrangement of the user.

16. A processor system for selecting an omnidirectional image for display to a user, the processor system comprising:
a communication interface configured for obtaining access to:
a number of omnidirectional images of a scene, wherein each of the omnidirectional images represents a different respective viewpoint relative to the scene;
for each of the omnidirectional images, metadata indicative of a physical relation between a capture height of the respective viewpoint and a physical object present in the scene, wherein the metadata is part of a data structure of the omnidirectional image;
a processor;
and memory storing instructions that, when executed by the processor, cause the processor system to carry out operations including:
obtaining viewer data which is indicative of a current physical relation between a viewing height of a viewpoint of the user and a same type of physical object in an environment of the user that is different from the scene;
comparing the viewer data to the metadata to identify one of the number of omnidirectional images of which the physical relation best matches the current physical relation in accordance with a match criterion; and
selecting the one of the number of omnidirectional images for display.

17. The processor system according to claim 16, further comprising a display interface configured to output display data representing the selected omnidirectional image to a display.

18. The processor system according to claim 16, further comprising a tracker interface to a tracking system which is configured to track the user in the environment, wherein the operations further include:
obtaining tracking data from the tracking system via the tracker interface which is indicative of a position and/or orientation of the user in the environment;
obtaining object data indicative of the position and/or orientation of the physical object in the environment; and
processing the tracking data and the object data to determine the current physical relation between the user and the physical object.

19. The processor system according to claim 16, further comprising:
a database, wherein the database is configured for storing:
a number of omnidirectional images of a scene, wherein each omnidirectional image represents a different viewpoint relative to the scene; and
for each of the images, metadata indicative of a physical relation between the respective viewpoint and a physical object in the scene, wherein the physical relation to the physical object is at least one of the group of:
a position with respect to a horizontal surface, or
a position with respect to a vertical surface.

20. The processor system according to claim 19, wherein the database is further configured for storing index data providing an index to the omnidirectional images on the basis of the physical relation.

21. A processor system for displaying an omnidirectional image of a scene to a user, the processor system comprising:
a communication interface configured for obtaining access to:
the omnidirectional image of the scene, wherein the omnidirectional image represents a viewpoint relative to the scene;
metadata indicative of a physical relation between a capture height of the respective viewpoint and a physical object present in the scene, wherein the metadata is part of a data structure of the omnidirectional image;
a display interface configured to output display data representing the omnidirectional image to a display; and
a user output interface configured to convey instructions to the user to assume a viewpoint in which a physical relation to a same type of physical object in an environment of the user corresponds to the physical relation as indicated by the metadata, wherein the environment of the user is different from the scene.

22. A non-transitory computer-readable medium comprising having instructions stored thereon that, when executed by one or more processors of a system, cause the system to carry out operations including:
acquiring the omnidirectional image from a viewpoint relative to the scene;
determining a physical relation between a capture height of the respective viewpoint and a physical object in the scene, wherein the physical relation to the physical object is at least one of the group of:
a position with respect to a horizontal surface, or
a position with respect to a vertical surface; and
generating metadata indicative of the physical relation, wherein the generated metadata is included in a data structure of the omnidirectional image.

* * * * *